United States Patent
Endoh (10) Patent No.: US 7,298,690 B2
(45) Date of Patent: Nov. 20, 2007

(54) OPTICAL RECORDING MEDIUM, MASTER FOR OPTICAL RECORDING MEDIUM MANUFACTURE, RECORDING AND REPRODUCING APPARATUS, AND RECORDING AND REPRODUCING METHOD

(75) Inventor: Sohmei Endoh, Miyagi (JP)

(73) Assignee: Sony Corporation, Tokyo (JP)

( * ) Notice: Subject to any disclaimer, the term of this patent is extended or adjusted under 35 U.S.C. 154(b) by 690 days.

(21) Appl. No.: 10/845,112

(22) Filed: May 14, 2004

(65) Prior Publication Data
US 2005/0007940 A1 Jan. 13, 2005

(30) Foreign Application Priority Data
May 15, 2003 (JP) ............... 2003-137051

(51) Int. Cl.
*G11B 7/24* (2006.01)
(52) U.S. Cl. ................. 369/275.4; 369/277
(58) Field of Classification Search ........... 369/277, 369/278; 428/64.2, 64.5
See application file for complete search history.

(56) References Cited

U.S. PATENT DOCUMENTS

| 6,683,832 B2 * | 1/2004 | Endoh ............. 369/44.26 |
| 6,819,650 B2 * | 11/2004 | Deno et al. ........... 369/275.4 |
| 7,236,449 B2 * | 6/2007 | Endoh ................ 369/275.4 |
| 2003/0117930 A1 * | 6/2003 | Endoh ................ 369/109.02 |
| 2003/0152013 A1 * | 8/2003 | Endoh et al. .......... 369/112.17 |
| 2004/0081069 A1 * | 4/2004 | Suenaga et al. ......... 369/275.4 |

FOREIGN PATENT DOCUMENTS

| JP | 4-149838 | 5/1992 |
| JP | 2000-331383 | 11/2000 |
| JP | 2001-319377 | 11/2001 |

\* cited by examiner

*Primary Examiner*—Wayne Young
*Assistant Examiner*—Abdukader Muhammed
(74) *Attorney, Agent, or Firm*—Oblon, Spivak, McClelland, Maier & Neustadt, P.C.

(57) ABSTRACT

To make a magneto-optical disk to have higher track density and enable stable tracking servo to be performed thereon. On an magneto-optical disk, a first groove Gv1, a second groove Gv2, and a third groove Gv3 are formed so as to be adjacently arranged. The first groove Gv1 and the second groove Gv2 are deep grooves, and the third groove Gv3 is a shallow groove. Data is recorded on six recording tracks of these three grooves and three lands between respective grooves. A CTS signal is obtained by a sum signal (A+B+C+D) of a photo-detector 6, and a push-pull signal is obtained by a difference signal (A+D)−(B+C) of a photo-detector 8.

8 Claims, 8 Drawing Sheets

OPTICAL RECORDING MEDIUM, MASTER FOR OPTICAL RECORDING MEDIUM MANUFACTURE, RECORDING AND REPRODUCING APPARATUS, AND RECORDING AND REPRODUCING METHOD

BACKGROUND OF THE INVENTION

1. Field of the Invention

The present invention relates to an optical recording medium having grooves formed along recording tracks and a master for optical recording medium manufacture used when manufacturing such optical recording medium. Further, the invention relates to a recording and reproducing apparatus and a recording and reproducing method for performing recording and/or reproduction processing on an optical recording medium having grooves formed along recording tracks.

2. Description of the Related Art

As conventional recordable disk-shape recording media, an MD (Mini Disc), a CD (Compact Disc)-R (Recordable), a CD-RW (ReWritable), a DVD (Digital Versatile Disc or Digital Video Disc)+RW (ReWritable), a DVD-R (Recordable), a DVD-RW (ReWritable), etc. are proposed. For formats of these disk-shape recording media, a groove recording format for recording in grooves is adopted.

For each format of an magneto-optical (MO) disk of ISO (International Organization for Standardization), a land recording format for recording in lands (between grooves) is proposed. In a DVD-RAM (Digital Video Disc-Random Access Memory) and the like, as one method for realizing higher density of an optical disk, a system (land and groove recording) for providing higher density by doubling the track density of the conventional one by recording in both grooves and between grooves (lands) is proposed. Here, the grooves refer to so-called guide grooves formed along recording tracks for mainly enabling tracking servo. The near part seen from an optical pickup is referred to as "groove", and the far part is referred to as "land". Note that the part between the grooves is referred to as "land".

Figure 1:
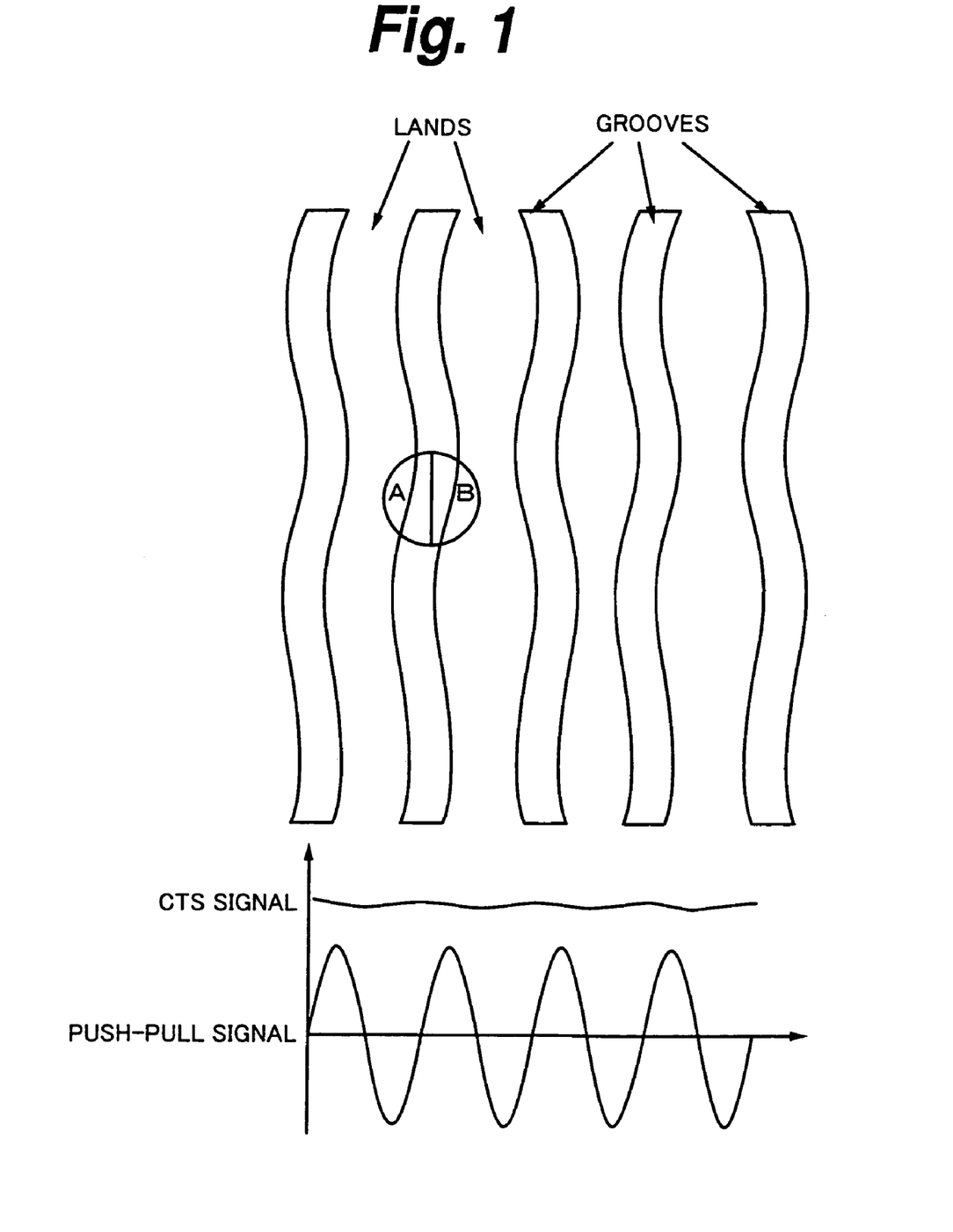
FIG. 1 is a diagram showing a part of a recording area, a waveform of a CTS signal, and a waveform of a push-pull signal of a conventional magneto-optical disk.

As shown in FIG. 1, in an optical recording medium having grooves formed, normally, tracking servo is performed using a push-pull signal. The push-pull signal refers to a difference signal, and is obtained by applying a light beam to the optical recording medium, detecting the light formed from the light beam reflected by the optical recording medium by two photo-detectors A and B disposed symmetrically relative to the track center, and calculating the difference (A−B) of outputs from these two photo-detectors A and B.

The reflected light amount of the light formed from the light beam reflected by the optical medium is detected as a sum (A+B) of the two photo-detectors. Here, a signal formed by detecting the reflected light amount of the light formed from the light beam reflected by the optical medium, that is, a sum signal of the outputs from the two photo-detectors A and B is a signal used for detecting how many tracks a spot of the light beam traverses when the spot of the light beam moves, and generally referred to as "Cross Track Signal (CTS)".

In an MD or a CD-R, a ratio of "groove width/track pitch" is selected as on the order of ⅓ or ⅔ so that the push-pull signal and the CTS signal may be obtained sufficiently. That is, in the case of an MD, "groove width/track pitch"=1.1 μm/1.6 μm=69%, and, in the case of a CD-R, "groove width/track pitch"=0.5 μm/1.6 μm=31%

Furthermore, as a technology for improving linear recording density, DWDD (Domain Wall Displacement Detection) is proposed. This is one of magnetic domain enlargement and reproduction technologies used in a magneto-optical disk. For example, in Patent Document 1, a technology relating to the DWDD system is disclosed.

Figure 2:
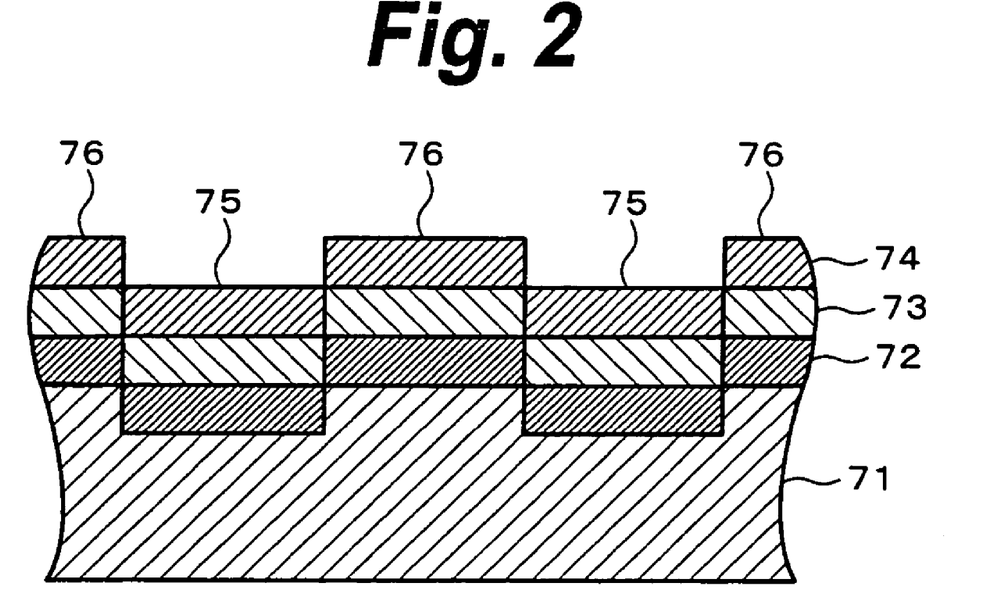
FIG. 2 is a partially sectional view used for explanation of a DWDD super resolution magneto-optical disk.

FIG. 2 shows a partially enlarged sectional view of a magneto-optical disk disclosed in the Patent Document 1. The reference sign 71 denotes a substrate, the reference sign 72 denotes a dielectric layer, the reference sign 73 denotes a recording layer, and the reference sign 74 denotes a dielectric layer. Further, the reference sign 75 denotes a groove, and the reference sign 76 denotes a land.

The recording layer 73 is formed by sequentially laminating a first magnetic layer, a second magnetic layer, and a third magnetic layer. The first magnetic layer is consisted of a perpendicular magnetizing film having relatively smaller magnetic domain wall magnetic drag and larger magnetic domain wall mobility to the third magnetic layer at temperature close to ambient temperature, the second magnetic layer is consisted of a magnetic layer having lower Curie temperature than the first magnetic layer and the third magnetic layer, and the third magnetic layer is consisted of a perpendicular magnetizing film. Recording of data signals is performed by modulating the exterior magnetic field while applying a power laser beam that makes the third magnetic layer at equal to or more than Curie temperature with the medium being moved.

Further, in Patent Document 2 and Patent Document 3, pre-format by which recording density equal to the land and groove recording is achieved, depths of two grooves are suitably changed, the two grooves having different depths are arranged adjacently, and sufficient CTS signal amplitude and push-pull signal amplitude can be obtained even when the cutoff frequency is exceeded is proposed. This pre-format realizes stable tracking servo in a track pitch exceeding the cutoff frequency. In the pre-format, deep grooves and shallow grooves are adjacently arranged, and the interval of the deep grooves (or shallow grooves) is a track period (1.0 μm) and the interval of the deep groove and the shallow groove is a track pitch (0.5 μm). Two lands (track A, track B) on both ends of the shallow groove sandwiched by deep grooves are a recording area. Therefore, the track density in the pre-format is high density twice the conventional one, that is, equal to the recording density of the land and groove recording.

That is, the track density of the land and groove recording is about twice the conventional one, and, in the pre-format, the recording area is also two lands (track A, track B) on both ends of the shallow groove, and equal to the track density of the land and groove recording. Therefore, it has been difficult to make the track density into higher density equal to or more than twice the conventional one.

Further, in the land and groove recording, the groove width and the land width are substantially the same. When the groove width and the land width are substantially the same, the push-pull signal provides a sufficient signal amount at the maximum, however, the signal amount of the CTS signal becomes insufficient, as shown in FIG. 1. In a normal disk reproducing apparatus, for seek operation, about 6% to 7% is required for a signal amount of a signal for counting the number of tracks, and, a signal amount of about 14% is required for a detection signal for tracking servo. Here, the signal amount is defined with a signal obtained on a surface on which no groove or pit is formed (so-called dummy surface) as 100%.

As described above, if the signal amount of the CTS signal is insufficient, at the time of seeking operation for moving toward a target address at high speed, there is a problem in seeking by the CTS signal because the number of traversed tracks can not be detected accurately from the CTS signal. Needless to add, it is impossible that tracking servo is applied with a CTS signal in a small signal amount.

Further, in order to obtain these push-pull signal and CTS signal having required signal amounts, the spatial frequency of the track pitch is needed to be made into about ½ to ⅔ of the cutoff frequency of the reproduction optical system, i.e., the optical pickup of the reproducing apparatus. Here, the cutoff frequency refers to a frequency at which the reproduction signal amplitude becomes nearly zero, and is expressed by 2NA/λ assuming that the wavelength of a laser beam used for data reproduction is λ, and the numerical aperture of an objective lens is NA.

Therefore, an object of the invention is to provide an optical recording medium, a master for optical recording medium manufacture, a recording and reproducing apparatus, and a recording and reproducing method by which higher track density is realized, and, even when the groove width and the land width are substantially the same, stable tracking servo can be obtained.

[Patent Document 1]
Japanese Patent Laid-Open Publication No. 6-290496
[Patent Document 2]
Japanese Patent Laid-Open Publication No. 11-296910
[Patent Document 3]
Japanese Patent Laid-Open Publication No. 2000-40259

OBJECTS AND SUMMARY OF THE INVENTION

In order to solve the above described problems, an optical recording medium having grooves formed along recording tracks and being applied with light having a predetermined wavelength λ for performing recording and/or reproduction, as the grooves, a first groove, a second groove, and a third groove shallower than the first groove and the second groove are formed so as to be arranged adjacently, the medium has six recording tracks of the first to third grooves and three lands between the respective first to third grooves, wherein, assuming that a refractive index of a medium from a light entrance surface to the grooves is n, a depth coefficient of the first and second grooves is x, x×n/λ is a phase depth X of the first and second grooves, a depth coefficient of the third groove is y, and y×n/λ is a phase depth Y of the third groove, the depth coefficient x of the first and second grooves and the depth coefficient y of the third groove satisfy the following expressions (9) and (10), is provided.

$$Y \leq 16.126X^5 - 123.24X^4 + 371.85X^3 - 544.35X^2 + 409.06X - 119.33 \quad (9)$$

$$Y \geq 1.8941X^4 - 11.776X^3 + 27.83X^2 - 29.495X + 11.887 \quad (10)$$

A fourth aspect of the invention is a master for optical recording medium manufacture used when manufacturing an optical recording medium having grooves formed along recording tracks and being applied with light having a predetermined wavelength λ for performing recording and/or reproduction, as the grooves, a first groove, a second groove, and a third groove shallower than the first groove and the second groove are formed so as to be arranged adjacently, the medium has six recording tracks of the first to third grooves and three lands between the respective first to third grooves, wherein, assuming that a refractive index of a medium from a light entrance surface to the grooves is n, a depth coefficient of the first and second grooves is x, x×n/λ is a phase depth X of the first and second grooves, a depth coefficient of the third groove is y, and y×n/λ is a phase depth Y of the third groove, the depth coefficient x of the first and second grooves and the depth coefficient y of the third groove satisfy the following expressions (11) and (12).

$$Y \leq 16.126X^5 - 123.24X^4 + 371.85X^3 - 544.35X^2 + 409.06X - 119.33 \quad (11)$$

$$Y \geq 1.8941X^4 - 11.776X^3 + 27.83X^2 - 29.495X + 11.887 \quad (12)$$

A fifth aspect of the invention is a recording and reproducing apparatus for an optical recording medium having grooves formed along recording tracks and being applied with light having a predetermined wavelength λ for performing recording and/or reproduction, as the grooves, a first groove, a second groove, and a third groove shallower than the first groove and the second groove are formed so as to be arranged adjacently, the medium has six recording tracks of the first to third grooves and three lands between the respective first to third grooves, the apparatus performs recording and/or reproduction on the six recording tracks of the optical recording medium in which, assuming that a refractive index of a medium from a light entrance surface to the grooves is n, a depth coefficient of the first and second grooves is x, x×n/λ is a phase depth X of the first and second grooves, a depth coefficient of the third groove is y, and y×n/λ is a phase depth Y of the third groove, the depth coefficient x of the first and second grooves and the depth coefficient y of the third groove satisfy the following expressions (13) and (14).

$$Y \leq 16.126X^5 - 123.24X^4 + 371.85X^3 - 544.35X^2 + 409.06X - 119.33 \quad (13)$$

$$Y \geq 1.8941X^4 - 11.776X^3 + 27.83X^2 - 29.495X + 11.887 \quad (14)$$

A seventh aspect of the invention is a recording and reproducing method for an optical recording medium having grooves formed along recording tracks and being applied with light having a predetermined wavelength λ for performing recording and/or reproduction, as the grooves, a first groove, a second groove, and a third groove shallower than the first groove and the second groove are formed so as to be arranged adjacently, the medium has six recording tracks of the first to third grooves and three lands between the respective first to third grooves, the method performs recording and/or reproduction on the six recording tracks of the optical recording medium in which, assuming that a refractive index of a medium from a light entrance surface to the grooves is n, a depth coefficient of the first and second grooves is x, x×n/λ is a phase depth X of the first and second grooves, a depth coefficient of the third groove is y, and y×n/λ is a phase depth Y of the third groove, the depth coefficient x of the first and second grooves and the depth coefficient y of the third groove satisfy the following expressions (15) and (16).

$$Y \leq 16.126X^5 - 123.24X^4 + 371.85X^3 - 544.35X^2 + 409.06X - 119.33 \quad (15)$$

$$Y \geq 1.8941X^4 - 11.776X^3 + 27.83X^2 - 29.495X + 11.887 \quad (16)$$

In the invention, since the recording area is formed as total six tracks of the first to third grooves and the first to third lands between respective two of them, track density can be made into remarkably higher density. Further, since the first and second grooves are formed as deep grooves and the third groove is formed as a shallow groove, by suitably setting the depths of these grooves, a CTS signal amount can be obtained sufficiently, stable tracking servo can be performed, and further, pre-format suitable for an optical recording medium having good recording and reproduction characteristics can be provided.

The above and other objects and features of the present invention will become apparent from the following detailed description and the appended claims with reference to the accompanying drawings.

DETAILED DESCRIPTION OF THE PREFERRED EMBODIMENT

Figure 3A:
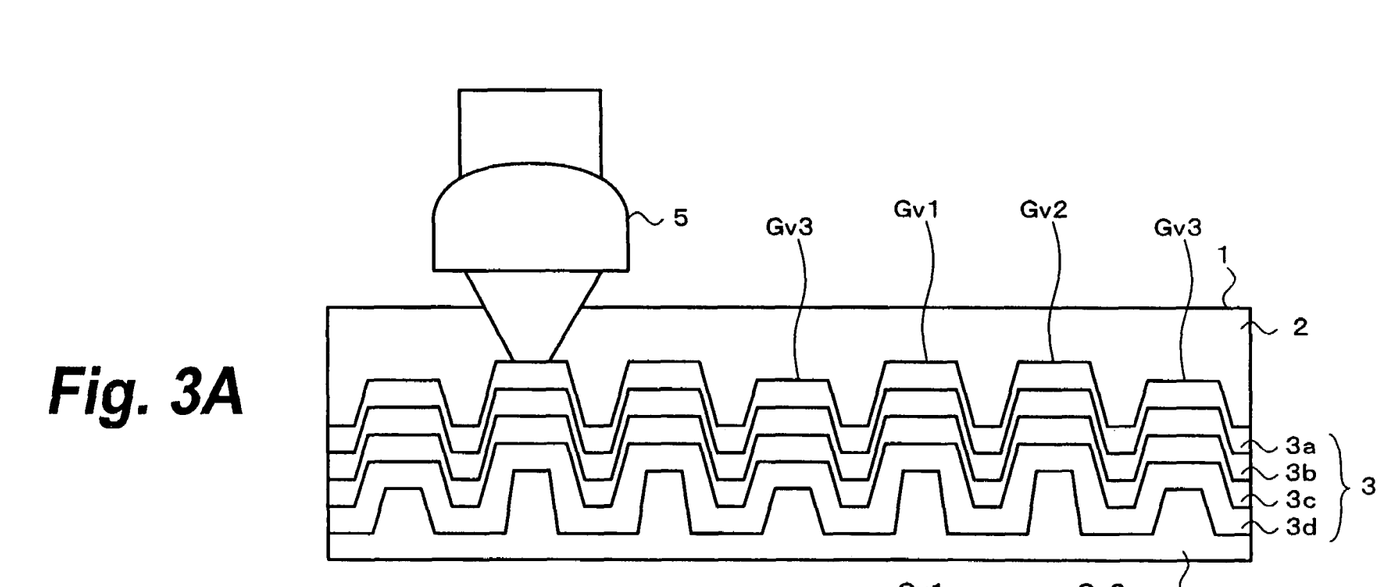
FIGS. 3A and 3B are sectional views of a magneto-optical disk to which the invention is applied, in which main parts thereof are enlarged.
Figure 3B:
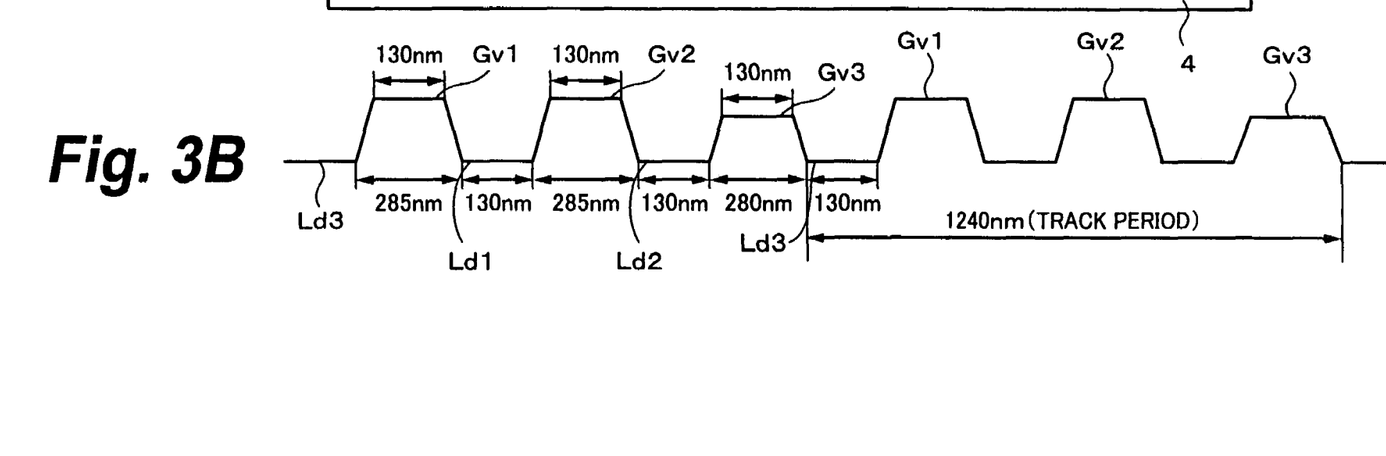
Figure 4A:
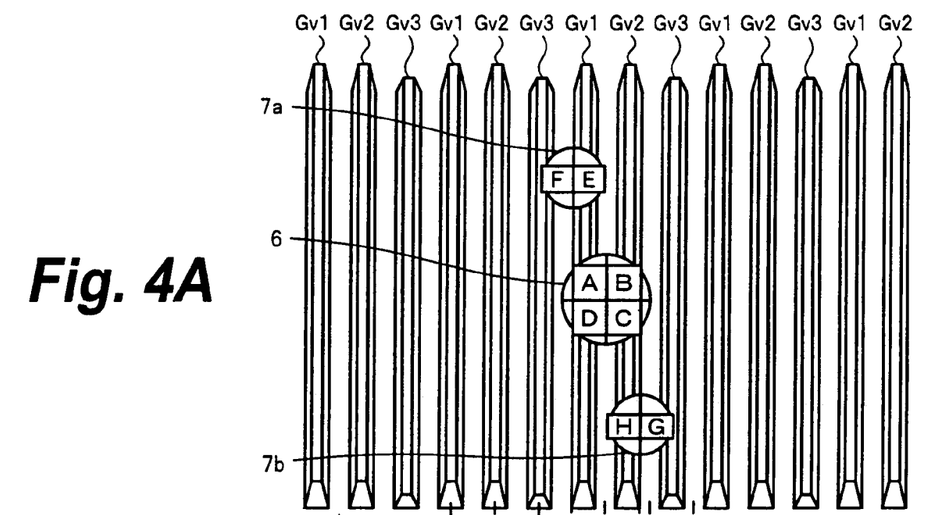
FIGS. 4A to 4C are diagrams showing a part of a recording area, a waveform of a CTS signal, and a waveform of a push-pull signal of the magneto-optical disk to which the invention is applied.
Figure 4B:
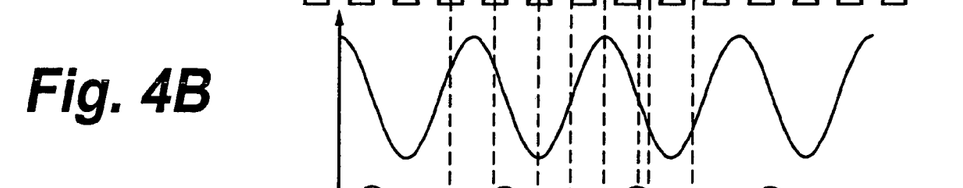
Figure 4C:
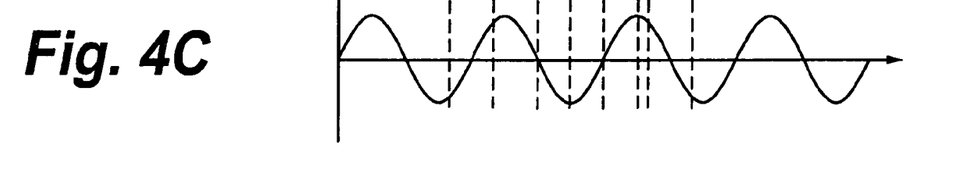

Hereinafter, embodiments of the invention will be described in detail by referring to the drawings. With respect to a magneto-optical disk to which the invention is applied, sectional views in which main parts thereof are enlarged are shown in FIGS. 3A and 3B. FIG. 3A shows a construction of the magneto-optical disk, and FIG. 3B shows an example of a specific recording track structure. FIGS. 4A to 4C are diagrams relating to a recording area of the magneto-optical disk. FIG. 4A is an enlarged view of a part of the recording area, FIG. 4B shows an output waveform of a CTS signal by a photo detector, and FIG. 4C is an output waveform of a push-pull signal by the photo detector.

The reference sign 1 in FIG. 3A denotes the magneto-optical disk. The magneto-optical disk 1 is formed in a disc shape, and recording and reproduction of data is performed by utilizing the magneto-optical effect. Further, the magneto-optical disk 1 includes a recording layer 3 on which magneto-optical recording is performed and a protective layer 4 for protecting the recording layer 3 formed on a disk substrate 2 consisted of polymethyl methacrylate (PMMA), polycarbonate (PC), etc. Here, the recording layer 3 is formed by laminating, for example, a first dielectric film 3a consisted of silicon nitride ($Si_3N_4$) etc., a magnetic film 3b, a second dielectric film 3c consisted of silicon nitride ($Si_3N_4$) etc., and a reflective film 3d consisted of an Al—Ti alloy, etc. Further, the protective layer 4 is formed, for example, by being spin coated with an ultraviolet curable resin on the recording layer 3, and applied with ultraviolet light. The magnetic film 3b is formed by sequentially laminating a first magnetic layer, a second magnetic layer, and a third magnetic layer. By the way, in the invention, the constitution of the recording layer 3 and the protective layer 4 is arbitrary, and not limited to this example.

In the magneto-optical disk 1, as shown in FIG. 4A by the enlarged view of a part of the recording area, grooves are formed in a convoluted form along the recording tracks, and recording and/or reproduction is performed by being applied with light having a predetermined wavelength λ by an optical pickup 5. As the grooves, a first groove Gv1, a second groove Gv2, and a third groove Gv3 are formed so as to be arranged adjacently.

The first groove Gv1 and the second groove Gv2 are deep grooves and the third groove Gv3 is a shallow groove. Further, three grooves of the first groove Gv1 and the second groove Gv2 (hereinafter, suitably referred to as "deep groove") and the third groove Gv3 (hereinafter, suitably referred to as "shallow groove") and three lands of a first land Ld1 between the first groove Gv1 and the second groove Gv2, a second land Ld2 between the second groove Gv2 and the third groove Gv3, and a third land Ld3 between the third groove Gv3 and the first groove Gv1 form recording tracks. That is, in the magneto-optical disk 1, the first groove Gv1, the second groove Gv2, and the third groove Gv3 and the first land Ld1, the second land Ld2, and the third land Ld3 are formed in a convoluted form, and there are six recording tracks of the respective grooves and the respective lands.

As shown in FIG. 3B, the respective grooves and the respective lands are formed nearly in the same width of 130 nm, for example. That is, the widths of the three lands (the first land Ld1, the second land Ld2, and the third land Ld3) and the top width (upper width) of the deep groove (the first groove Gv1, the second groove Gv2) and the top width (upper width) of the shallow groove (the third grooves Gv3) are formed nearly in the same width. Thus, by making the widths of the recording tracks nearly the same, recording and reproduction characteristics can be made better.

Further, a period of each of the six recording tracks is set to 1240 nm, for example, the bottom width of the first groove Gv1, i.e., the width between the third land Ld3 and the first land Ld1 and the bottom width of the second groove Gv2, i.e., the width between the first land Ld1 and the second land Ld2 are set to the same width of 285 nm, for example, and the bottom width of the third groove Gv3, i.e., the width between the second land Ld2 and the third land Ld3 is set to 280 nm, for example.

By thus forming the six recording tracks, the track density of the magneto-optical disk 1 can be by far higher compared to that of the conventional one.

As shown in FIG. 4A, the magneto-optical disk 1 to which the invention is applied is reproduced with three beams. A center beam is located at the center of the two adjacent deep grooves, and two side beams are located on both sides of the center beam. The reflected light of the center beam is detected by a four-part split photo detector 6, and the reflected light of the side beams is detected by two-part split photo detectors 7a and 7b.

The CTS signal shown in FIG. 4B is obtained from a sum signal (A+B+C+D) of the four-part split photo detector 6. Thus obtained CTS signal has the same period with the track period and a sufficient amplitude, and takes the maximum value in the central position between the adjacent two deep grooves and the minimum value in the central position of the shallow groove.

In the case where tracking servo is applied with the sum signal, a tracking error is obtained from the difference (E+F)−(G+H) between the respective sum signals of the two-part split photo detectors 7a and 7b. The push-pull signal shown in FIG. 4C is obtained by calculating the sums (A+D) and (B+C) of detection signals of the respective two areas located on both sides relative to the track extension direction of the four-part split photo detector 6 and the difference (A+D)−(B+C) between these sum signals. Thus obtained push-pull signal has the same period with the track period and takes zero in the central position between the adjacent two deep grooves and the central position of the shallow track. Specifically, as shown in FIG. 4A, the positions of the side beams, i.e., the positions of the two-part split photo detectors 7a and 7b are disposed in main beam positions, that is, the positions of the radially quarter period of the four-part split photo detector 6, and thereby, the tracking servo is applied by a tri-spot method with these three beams.

As described above, the locations where data is recorded are the first groove Gv1, the second groove Gv2, and the third groove Gv3, and the first land Ld1, the second land Ld2, and the third land Ld3. When seeking in the first groove Gv1, for example, the position where the push-pull signal level is −90% and the CTS signal is increasing is sought. When seeking in the second groove Gv2, for example, the position where the push-pull signal level is +90% and the CTS signal is decreasing is sought. When seeking in the third groove Gv3, for example, the position where the push-pull signal level is zero and the CTS signal takes the minimum value is sought.

Further, when seeking in the first land Ld1, for example, the position where the push-pull signal level is zero and the CTS signal takes the maximum value is sought. When seeking in the second land Ld2, for example, the position where the push-pull signal level is +90% and the CTS signal is decreasing is sought. When seeking in the third land Ld3, for example, the position where the push-pull signal level is −90% and the CTS signal is increasing is sought.

When the above described magneto-optical disk 1 is manufactured, a master for magneto-optical medium manufacture as a master of the magneto-optical medium is required to be fabricated, and a laser cutting device is used therefor. As below, an example of the laser cutting device used for fabrication of the master for magneto-optical medium manufacture will be described in detail by referring to FIG. 5.

Figure 5:
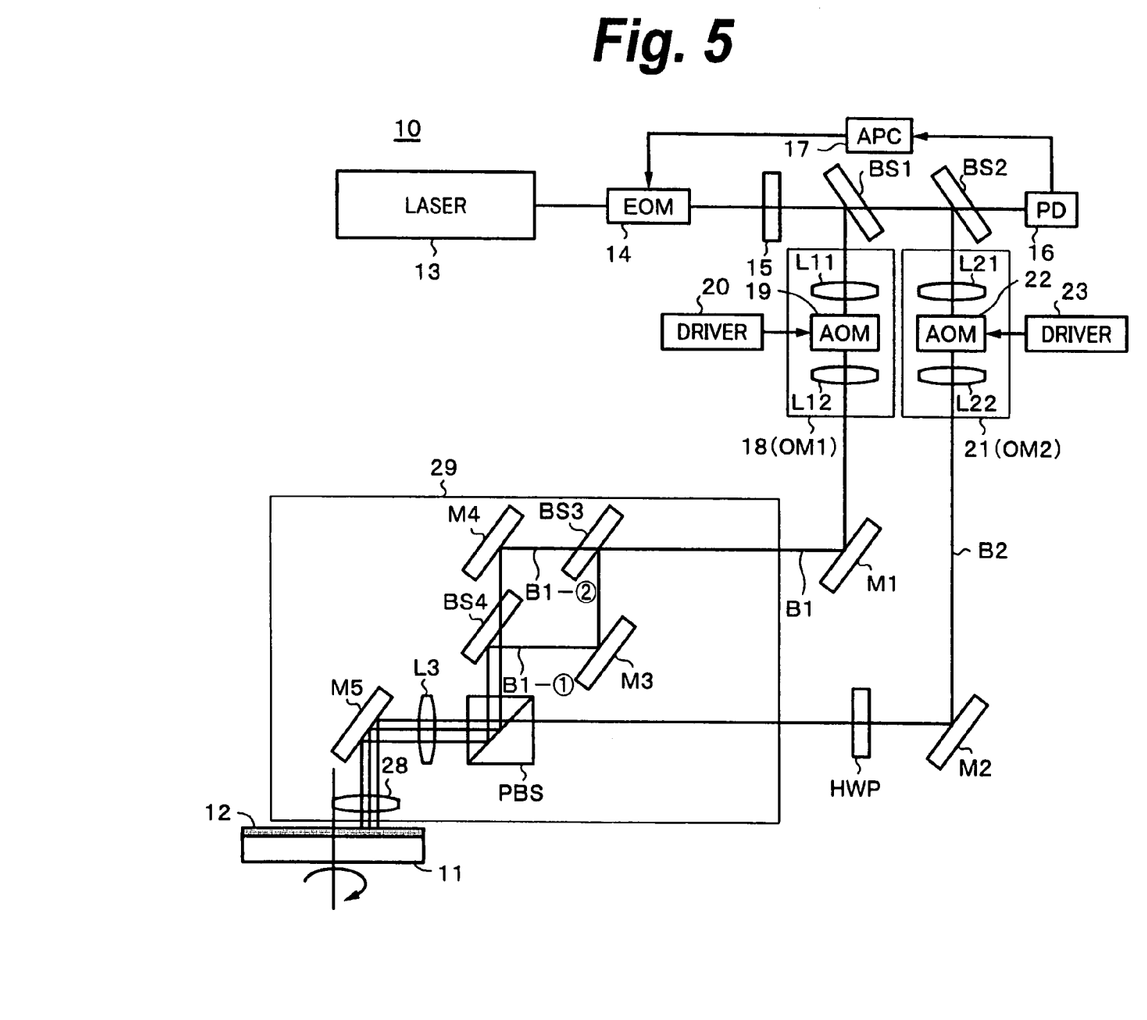
FIG. 5 is a diagram showing an outline of an optical system of an example of a laser cutting device used when fabricating an optical recording medium and a master for optical recording medium manufacture according to the invention.

The example of the laser cutting apparatus described here forms a concavo-convex pattern in which two deep grooves and one shallow groove are arranged alternately and radially at even intervals by splitting a laser beam output from a light source into a first exposure beam (for deep groove formation) and a second exposure beam (for shallow groove formation) by a beam splitter and a mirror, further splitting the first exposure beam into two exposure beams (an exposure beam 1-1 and an exposure beam 1-2) by a beam splitter and a mirror, disposing these split three beams radially at suitable intervals, and selecting each exposure power suitably.

A laser cutting device 10 shown in FIG. 5 is for exposing a photoresist 12 applied on a glass substrate 11 with light to form a latent image on the photoresist 12. When a latent image is formed on the photoresist 12 by the laser cutting device 10, the grass substrate 11 applied with the photoresist 12 is mounted on a rotationally driving unit provided on a moving optical table. When the photoresist 12 is exposed, the glass substrate 11 is rotationally driven by the rotationally driving unit and moved in parallel by the moving optical table so that the photoresist 12 may be exposed with light over the entire surface thereof in a desired pattern.

The laser cutting device 10 includes a light source 13 for outputting a laser beam, an electro optical modulator (EOM) 14 for adjusting light intensity of the laser light output from the light source 13, an analyzer 15 disposed on an optical axis of the laser beam output from the electro optical modulator 14, a first beam splitter BS1 and a second beam splitter BS2 for splitting the laser beam transmitted through the analyzer 15 into reflected light and transmitted light, a photo detector (PD) 16 for detecting the laser beam transmitted through the second beam splitter BS2, a light output control unit (APC: Auto Power Controller) 17 for applying a signal field to the electro optical modulator 14 and adjusting intensity of the laser beam output from the electro optical modulator 14.

The laser beam output from the light source 13 is, first, made to have predetermined light intensity by the electro optical modulator 14 that is driven by the signal field applied by the APC 17, and then, input to the analyzer 15. Here the analyzer 15 is an analyzer for transmitting S polarized light only, and the laser beam transmitted through the analyzer 15 becomes S polarized light.

Note that, for the light source 13, any one can be used, however, a light source that outputs a short-wavelength laser beam is preferable. Specifically, for example, a Kr laser for outputting a laser beam having a wavelength $\lambda$ of 351 nm, a He—Cd laser for outputting a laser beam having a wavelength % of 442 nm, and the like are suitable for the light source 13.

The light intensity of the laser beams transmitted through the beam splitters BS1 and BS2 is detected by the photo detector 16, and a signal according to the light intensity is sent from the photo detector 16 to the APC 17. Then, the APC 17 adjusts the signal field to be applied to the electro optical modulator 14 so that the light intensity detected by the photo detector 16 may be constant at a predetermined level. Thereby, feedback control is performed so that the light intensity output from the electro optical modulator 14 may be constant and a stable laser beam with less noise is obtained.

The laser beam output from the light beam 13 is reflected by the beam splitter BS1, and the reflected light of the beam splitter BS1 is entered into an optical modulation system (shown by OM1 in FIG. 5) 18. A beam relay optical system and an AOM 19 provided in an intermediate position thereof are arranged so as to satisfy Bragg condition. The relay optical system is arranged so as to concentrate the laser beam output from the light source 13 onto the AOM 19 using a lens L11. The laser beam is intensity modulated based on an ultrasonic wave supplied to the AOM 19. To the AOM 19, a drive signal is supplied from a driver 20.

The drive signal is a direct current signal in the case of groove formation. If a pit is formed, the modulated signal is a direct current signal. In response to the direct current signal, the laser beam is continuously modulated and an exposure beam B1 for deep groove formation is formed.

The laser beam intensity modulated by the AOM 19 and diverging is made into a collimated beam by a lens L12. Then, the exposure beam B1 output from the optical modulation system 18 (OM1) is reflected by a mirror M1 and guided onto a moving optical table 29 horizontally and in parallel.

Furthermore, the laser beam output from the light source 13 is reflected by the beam splitter BS2, and the reflected light of the beam splitter BS2 is entered into an optical modulation system (shown by OM2 in FIG. 5) 21. A beam relay optical system (a lens L21 and a lens L22) and an AOM 22 provided in an intermediate position thereof are arranged so as to satisfy Bragg condition. The laser beam is intensity modulated based on an ultrasonic wave supplied to the AOM 22. To the AOM 22, a drive signal is supplied from a driver 23. In response to a level of the direct current signal, the laser beam is continuously modulated and an exposure beam B2 for shallow groove formation is formed. The laser beam intensity modulated by the AOM 22 and diverging is made into a collimated beam by a lens L22, reflected by a mirror M2, and entered into a polarizing beam splitter PBS via an HWP (half wavelength plate).

The laser beam (the exposure beam B1) reflected by the mirror M1 and guided horizontally onto the moving optical table 29 is entered into the beam splitter BS3 to be split into an exposure beam B1-1 for the first deep groove formation and an exposure beam B1-2 for the second deep groove formation. The exposure beam B1-1 is reflected by a mirror M3, and the exposure beam B1-2 is reflected by a mirror M4 and the traveling direction thereof is bent 900. Then, the split two exposure beams (the exposure beam B1-1 and the exposure beam B1-2) are recombined by a beam splitter BS4, and then, entered into the polarizing beam splitter PBS.

Here, the polarizing beam splitter PBS is arranged so as to reflect S polarized light and transmit P polarized light. Further, the exposure beam B1-1 and the exposure beam B1-2 are S polarized light, and the exposure beam B2 entered into the polarizing beam splitter PBS via the HWP is P polarized light. Therefore, the exposure beam B1-1 and the exposure beam B1-2 are reflected by the polarizing beam splitter PBS, and the exposure beam B2 is transmitted through the polarizing beam splitter PBS. Thereby, the exposure beam B1-1, the exposure beam B1-2, and the exposure beam B2 are recombined so that the traveling directions thereof may be the same.

The exposure beam B1-1, the exposure beam B1-2, and the exposure beam B2 recombined so that the traveling directions thereof may be the same and output from the polarizing beam splitter PBS are made to have a predetermined beam diameter by a magnifying lens L3, and then, reflected by a mirror M5, guided to an objective lens 28, and concentrated onto the photoresist 12 by the object lens 28. Note that the exposure beam B1-1, the exposure beam B1-2, and the exposure beam B2 recombined so that the traveling directions thereof may be the same and output from the polarizing beam splitter PBS can be applied onto the photoresist 12 at suitable radial intervals by changing angles of the polarizing beam splitter PBS and the beam splitter BS4. Then, by making intensity of the laser beams adjustable to be different, recording areas by three laser beams arranged at suitable intervals can be formed.

The photoresist 12 is exposed with the three laser beams and latent images are formed on the photoresist 12. At this time, the glass substrate 11 applied with the photoresist 12 is rotationally driven by the rotationally driving unit so that the exposure is performed over the entire surface of the photoresist 12 in a desired pattern and the laser beam is radially moved by the moving optical table. As a result, latent images according to the irradiation locus of the laser beam is formed over the entire surface of the photoresist 12.

Note that the objective lens 28 for concentrating the laser beam onto the photoresist 12 is preferably a lens having a larger numerical aperture NA for enabling formation of a finer groove pattern, and specifically, an objective lens having a numerical aperture NA on the order of 0.9 is suitable.

As an example, focal lengths of the concentrating lenses L11 and L21 of the optical modulation systems 18 and 20 are set to 80 mm, focal lengths of the collimating lenses L12 and L22 are set to 120 mm, a focal length of the magnifying lens L3 is set to 50 mm, respectively. In this case, with respect to the two deep grooves, the laser power is selected as 0.35 ml/m, and, with respect to the shallow groove, the laser power is selected as 0.15 mj/m. In the case of the deep groove, since exposure is performed so as to penetrate the photoresist 12, change in depth of the deep groove is obtained as change in thickness of the photoresist 12. On the other hand, in the case of the shallow groove, since exposure is performed so as not to penetrate the photoresist 12, change in depth of the shallow groove is obtained as change in laser power. In consideration of this point, the depths of the two grooves are set to suitable ones.

Next, a manufacturing method of the magneto-optical disk 1 shown in FIGS. 3A and 3B will be described in detail by citing a specific example. In the manufacture of the magneto-optical disk 1, in a mastering process, first, manufacture of a glass master as a base of a master for magneto-optical medium manufacture is performed. In the manufacture of the glass master, first, the disk-shaped glass substrate 11 and having a ground surface is cleaned and dried, and then, onto this glass substrate 11, the photoresist 12 as a photosensitive material is applied. Next, the photoresist 12 is exposed with light by the above described laser cutting device 10, and latent images corresponding to the three kinds of grooves are formed on the photoresist 12.

After the latent images are formed on the photoresist 12, the glass substrate 11 is placed on a turning table of a developing unit with the surface on which the photoresist 12 is applied facing upward. Then, while rotating the glass substrate 11 by rotating the turning table, development processing is performed by dropping developer on the photoresist 12 to form a concavo-convex pattern corresponding to the respective two deep grooves and the shallow groove on the glass substrate 11.

Figure 6A:
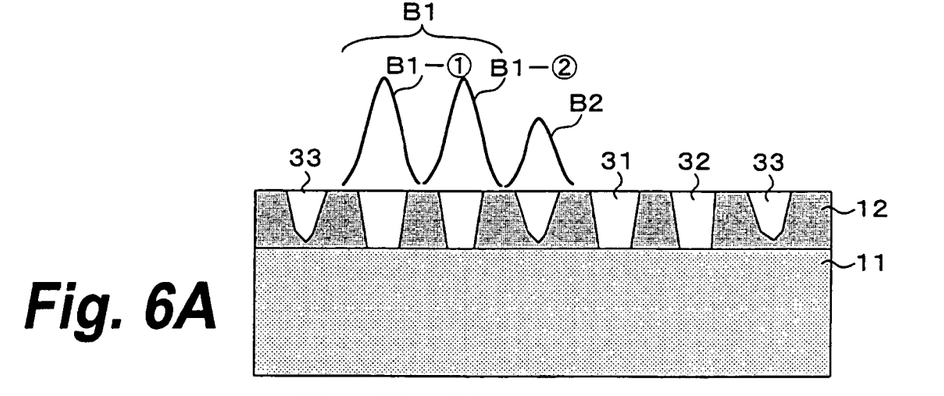
FIGS. 6A to 6E are partially sectional views for explanation of fabrication of the master for optical recording medium manufacture according to the invention.

Here, a specific example of the glass master forming method by the laser cutting device 10 will be described in detail by referring to the drawings. FIGS. 6A to 6E are sectional views of a master in the glass master forming process. The wavy lines shown on top of FIG. 6A represent laser power when forming deep grooves 31, 32 and a shallow groove 33, respectively. The higher the height of the wavy line is shown, the stronger the laser power is. The deep groove 31 is for forming the first groove Gv1, the deep groove 32 is for forming the second groove Gv2, and the shallow groove 33 is for forming the third groove Gv3. Accordingly, a latent image for the deep groove 31 is formed on the photoresist 12 by irradiation with the exposure beam B1-1, a latent image for the deep groove 32 is formed on the photoresist 12 by irradiation with the exposure beam B1-2, a latent image for the shallow groove 33 is formed on the photoresist 12 by irradiation with the exposure beam B2.

First, the photoresist 12 is applied onto the glass substrate 11 in thickness of 150 nm. Then, in an area where deep groove shapes are to be formed, i.e., an area on the surface of the photoresist 12 where the deep grooves 31, 32 are formed, laser beams having laser power capable of exposing the surface of the glass substrate 11, for example, on the order of 0.36 mj/m are applied, and latent images for the U-shaped deep grooves 31, 32 are formed on the photoresist 12.

Further, a laser beam having laser power lower than that used when forming the deep grooves 31, 32, for example, on the order of 0.18 mj/m is applied in an area where a shallow groove is to be formed, i.e., an area on the surface of the photoresist 12 where the shallow groove 33 is formed, and a latent image for the shallow groove 33 that does not reach the surface of the glass substrate is formed on the photoresist 12. Specifically, the latent image is formed with laser power for making the shallow groove 33 in depth of 50 nm to 100 nm.

By dissolving the formed latent image part with developer, the glass substrate 11 having the photoresist 12 in which convoluted three grooves are formed on the entire surface thereof as shown in FIG. 6A is formed.

Figure 6B:
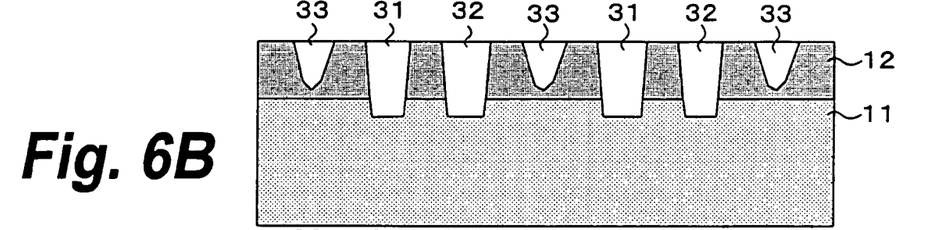

Next, the first plasma etching is performed on the applied surface of the photoresist 12 within an atmosphere of gas such as $CHF_3$ gas. As a result, in the part of the deep grooves 31, 32 where the surface of the glass substrate 11 is exposed, etching progresses to form grooves on the glass substrate 11, however, in the part of the shallow groove 33, the photoresist 12 serves as a mask and the part is not etched. The etching amount in the part of the deep grooves 31, 32 is set at that time on the order of 90 nm. Thereby, the deep grooves 31, 32 shown in FIG. 6A become the deep grooves 31, 32 as shown in FIG. 6B.

Figure 6C:
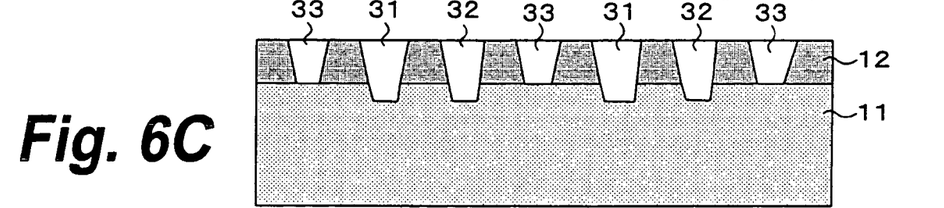

Then, as shown in FIG. 6C, the photoresist 12 is $O_2$ ashed until the bottom face of the shallow groove 33 reaches the surface of the glass substrate 11. The ashing amount of the photoresist 12 here is set on the order of 80 nm. Thereby, the residual film thickness of the photoresist becomes on the order of 70 nm.

Figure 6D:
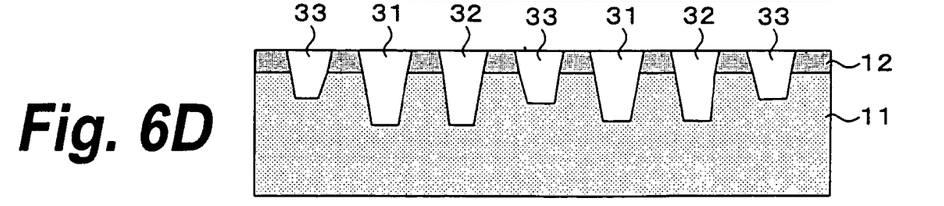

Next, the second plasma etching is performed on the applied surface of the photoresist 12 within an atmosphere of gas such as $CHF_3$ gas. Specifically, etching is performed so that the etching depth in the part of the shallow groove 33 of the glass substrate 11 may become 50 nm to 200 nm. Simultaneously, the part of the deep grooves 31, 32 of the glass substrate 11 are also etched. The etching depth in the part of the deep grooves 31, 32 is set to 140 nm to 290 nm including the first etching depth. Thereby, the deep grooves 31, 32 and the shallow groove 33 shown in FIG. 6C become the deep groove 31, the deep groove 32, and the shallow groove 33 as shown in FIG. 6D.

Figure 6E:
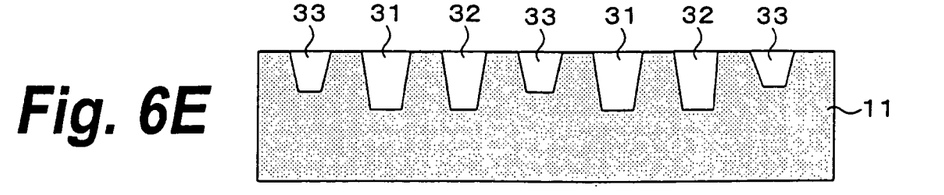

Finally, as shown in FIG. 6E, by eliminating the photoresist 12 completely by $O_2$ ashing, an optical disk glass master having the deep grooves 31, 32 (two deep grooves) in depth on the order from 140 nm to 290 nm and the shallow groove 33 (shallow groove) in depth on the order from 50 nm to 200 nm is obtained. Thus obtained groove shapes are not V-shape but U-shape because the shapes are obtained by plasma etching. As described above, the glass master on which a concavo-convex pattern corresponding to the respective two deep grooves and shallow groove is formed is completed.

In the mastering process, next, a conducting film consisted of nickel etc. is formed on the completed concavo-convex pattern of the glass master by electroless plating, and then, the glass substrate 11 on which the conducting film has been formed is mounted on an electroforming apparatus to form a nickel plating layer having a thickness on the order of 300±5 [μm] on the conducting film by electroplating. Subsequently, this plating layer is peeled, the peeled plating is cleaned using acetone etc., and the photoresist 12 remaining on the surface on which the concavo-convex pattern is transferred is eliminated.

By the above described processes, the master for optical recording medium manufacture having plating thereon formed by transferring the concavo-convex pattern that has been formed on the glass substrate 11, i.e., the master (so-called stamper) for optical recording medium manufacture on which the concavo-convex pattern respectively corresponding to the deep grooves and the shallow groove is completed.

Next, as a transfer process, a disk substrate shaped by transferring the surface shape of the master for optical recording medium manufacture thereon is fabricated using the photo polymerization method (so-called 2P method). Specifically, first, a photopolymer is applied smoothly onto the surface on which the concavo-convex pattern of the master for optical recording medium manufacture has been formed to form a photopolymer layer, and then, while preventing bubbles and dirt from entering the photopolymer layer, a base plate is allowed to adhere to the photopolymer layer. Here, for the base plate, for example, a base plate consisted of polymethyl methacrylate (refractive index 1.49) in thickness of 1.2 mm is used.

Subsequently, the photopolymer is cured by applying ultraviolet light, and then, by separating the master for optical recording medium manufacture, a disk substrate 2 shaped by transferring the surface shape of the master for optical recording medium manufacture thereon is fabricated.

Note that, here, the example of fabricating the disk substrate 2 using the 2P method in order to make the concavo-convex pattern formed on the master for optical recording medium manufacture to be transferred on to the disk substrate 2 more precisely has been described, however, in the case of mass production of the disk substrate 2, needless to add, the disk substrate 2 may be fabricated by injection molding using a transparent resin such as polymethyl methacrylate and polycarbonate.

Next, as a film forming process, a recording layer 3 and a protective layer 4 are formed on the disk substrate 2 shaped by transferring the surface shape of the master for optical recording medium manufacture thereon. Specifically, for example, first, on the surface of the disk substrate 2 on which the concavo-convex pattern is formed, films are formed using a sputtering device and the like in the order of a first dielectric film 3a consisted of silicon nitride ($Si_3N_4$) etc., a magnetic layer 3b as a magneto-optical recording layer consisted of terbium iron cobalt (TbFeCo) etc., a second dielectric film 3c consisted of silicon nitride ($Si_3N_4$) etc., and a light reflective film 3d consisted of an aluminum alloy (for example, Al—Ti) etc.

As a result, the recording layer 3 constituted by the first dielectric layer 3a, the magnetic layer 3b, the second dielectric layer 3c, and the light reflective layer 3d is formed. Subsequently, an ultraviolet curable resin is applied onto the recording layer 3 smoothly by the spin coating method and the like so as to cover the nearly entire surface of the substrate on the substrate 3, and the ultraviolet curable resin is cured by applying ultraviolet light to form the protective layer 4. By the above described processes, the magneto-optical disk 1 is completed.

Next, results of fabricating plural magneto-optical disks for evaluation by the above described manufacturing method (2P method) or injection molding, and evaluating them will be described. The evaluation operation is performed using an MD evaluation machine including an optical pickup (wavelength $\lambda$=650 nm, NA=0.52).

In the evaluation operation, even if the three land widths of the land Ld1, the land Ld2, and the land Ld3, two deep groove top widths of the groove Gv1 and the groove Gv2, and the shallow groove top width of the groove Gv3 are substantially the same, the deep groove and the shallow groove are provided as grooves, and the depths of the deep groove and the shallow groove are suitably selected, and thereby, whether tracking servo can be applied by a CTS signal is evaluated. In the magneto-optical disk as in the embodiment, recording and reproduction characteristics of six recording tracks are evaluated.

In the case where the groove top widths and the land widths are the same, whether a CTS signal in a signal amount capable of applying tracking servo (for example, equal to or more than 14%) is obtained to the widths of the deep grooves and the depth of the shallow groove is evaluated. The evaluation values in Table 1 through Table 8 are on an evaluation disk having the structure shown in FIG. 4.

Further, in the tables, $\lambda/xn$ represents a depth of a groove, and $\lambda$ is a wavelength of a laser beam, for example, 650 nm, n represents a refractive index of a disk substrate from a light entrance surface to a groove, for example, 1.58 (polycarbonate substrate), and x represents a coefficient. The value of x is changed. By the value of x, the groove width (nm) is defined. For example, for x=8, 650 nm/(8×1.58)=650 nm/12.64≈51 nm. Note that, here, both a coefficient x of a deep groove and a coefficient y of a shallow groove are set to the groove depth coefficient x.

The following table 1 shows amplification changes of the push-pull signal and the CTS signal when changing the depth of the shallow groove, in the case where the value of the coefficient x of the two deep grooves is set as x=2.7, that is, the groove depth is set to 152 nm (fractional portion of the number is rounded off). As the evaluation disk, one evaluation disk is manufactured corresponding to each depth of the shallow groove. Alternatively, an evaluation disk in which the depth of the shallow groove changes on one disk sequentially is manufactured.

TABLE 1

| Deep Groove | x = 2.7 | | | | | | |
|---|---|---|---|---|---|---|---|
| | $\lambda/xn$ = 152 nm | | | | | | |
| Shallow Groove | x: 16 | 8 | 5 | 4.5 | 4 | 3 | 2.8 |
| | nm: 26 | 51 | 82 | 91 | 103 | 137 | 147 |
| Push-pull (%) | 42.5 | | 19.1 | 13.6 | 7.6 | 1.8 | 1.4 |
| CTS (%) | 9.1 | | -13.9 | -16.4 | -18.2 | -15.7 | -13.4 |

The following table 2 shows amplification changes of the push-pull signal and the CTS signal when changing the depth of the shallow groove, in the case where the value of the coefficient x of the two deep grooves is set as x=2.5, that is, the groove depth is set to 165 nm (fractional portion of the number is rounded off).

TABLE 2

| Deep Groove | x = 2.5 | | | | | | |
|---|---|---|---|---|---|---|---|
| | $\lambda/xn$ = 165 nm | | | | | | |
| Shallow Groove | x: 16 | 8 | 6.7 | 5 | 4.2 | 3 | 2.5 |
| | nm: 26 | 51 | 61 | 82 | 98 | 137 | 165 |
| Push-pull (%) | 47.2 | 44.1 | 39.4 | 25.5 | 14.1 | 2.5 | 2.3 |
| CTS (%) | 3.3 | -8.7 | -13.7 | -22.4 | -26.1 | -23.6 | -15.7 |

The following table 3 shows amplification changes of the push-pull signal and the CTS signal when changing the depth of the shallow groove, in the case where the value of the coefficient x of the two deep grooves is set as x=2.3, that is, the groove depth is set to 179 nm (fractional portion of the number is rounded off).

TABLE 3

| Deep Groove | x = 2.3 | | | | | |
|---|---|---|---|---|---|---|
| | $\lambda/xn$ = 179 nm | | | | | |
| Shallow Groove | x: 16 | 8.5 | 8 | 6 | 4 | 2.3 |
| | nm: 26 | 48 | 51 | 69 | 103 | 179 |
| Push-pull (%) | 46.3 | 49.0 | 48.3 | 40.8 | 14.3 | 2.3 |
| CTS (%) | -2.0 | -13.4 | -15.1 | -24.3 | -35.6 | -19.0 | of the push-pull signal and the CTS signal when changing the depth of the shallow groove, in the case where the value of the coefficient x of the two deep grooves is set as x=2.1, that is, the groove depth is set to 196 nm (fractional portion of the number is rounded off).

TABLE 4

| Deep Groove | x = 2.1 | | | | | |
|---|---|---|---|---|---|---|
| | $\lambda/xn$ = 196 nm | | | | | |
| Shallow Groove | x: 16 | 9.6 | 8 | 5 | 4 | 3.86 | 2.1 |
| | nm: 26 | 43 | 51 | 82 | 103 | 107 | 196 |
| Push-pull (%) | 36.7 | 44.9 | 46.0 | 33.7 | 16.6 | 13.4 | 1.9 |
| CTS (%) | -5.1 | -13.7 | -18.7 | -35.6 | -32.0 | -42.5 | -20.8 | of the push-pull signal and the CTS signal when changing the depth of the shallow groove, in the case where the value of the coefficient x of the two deep grooves is set as x=1.9, that is, the groove depth is set to 217 nm (fractional portion of the number is rounded off).

TABLE 5

| Deep Groove | x = 1.9 | | | | | |
|---|---|---|---|---|---|---|
| | $\lambda/xn$ = 217 nm | | | | | |
| Shallow Groove | x: 16 | 8.7 | 8 | 6 | 4 | 3.9 | 1.9 |
| | nm: 26 | 47 | 51 | 69 | 103 | 105 | 217 |
| Push-pull (%) | 16.5 | 31.8 | 33.4 | 35.1 | 16.6 | 14.4 | 0.9 |
| CTS (%) | -3.5 | -13.9 | -16.3 | -26.6 | -42.0 | -42.5 | -19.4 | of the push-pull signal and the CTS signal when changing the depth of the shallow groove, in the case where the value of the coefficient x of the two deep grooves is set as x=1.7, that is, the groove depth is set to 242 nm (fractional portion of the number is rounded off).

TABLE 6

| Deep Groove | x = 1.7 | | | | | | | | |
|---|---|---|---|---|---|---|---|---|---|
| | λ/xn = 242 nm | | | | | | | | |
| Shallow Groove | x: | 8 | 7 | 7.4 | 6.2 | 6 | 5 | 4.1 | 2.05 | 1.7 |
| | nm: | 51 | 59 | 56 | 66 | 69 | 82 | 100 | 201 | 242 |
| Push-pull (%) | | 10.9 | 14.9 | 13.2 | 17.6 | 18.2 | 19.0 | 13.4 | 24.3 | 0.6 |
| CTS (%) | | -5.0 | -9.1 | -7.3 | -13.4 | -14.6 | -22.2 | -29.9 | -13.6 | -13.2 |

The following table 7 shows amplification changes of the push-pull signal and the CTS signal when changing the depth of the shallow groove, in the case where the value of the coefficient x of the two deep grooves is set as x=1.5, that is, the groove depth is set to 274 nm (fractional portion of the number is rounded off).

TABLE 7

| Deep Groove | x = 1.5 | | | |
|---|---|---|---|---|
| | λ/xn = 274 nm | | | |
| Shallow Groove | x: | 3 | 3.15 | 3.4 |
| | nm: | 137 | 131 | 121 |
| Push-pull (%) | | 6.1 | 3.5 | 2.3 |
| CTS (%) | | -13.1 | -13.3 | -12.9 |

The following table 8 shows amplification changes of the push-pull signal and the CTS signal when changing the depth of the shallow groove, in the case where the value of the coefficient x of the two deep grooves is set as x=2.84, that is, the groove depth is set to 145 nm (fractional portion of the number is rounded off).

TABLE 8

| Deep Groove | x = 2.84 | | | |
|---|---|---|---|---|
| | λ/xn = 145 nm | | | |
| Shallow Groove | x: | 3.7 | 3.75 | 3.8 |
| | nm: | 111 | 110 | 108 |
| Push-pull (%) | | 2.9 | 3.3 | 3.6 |
| CTS (%) | | -13.4 | -13.5 | -13.4 |

In these tables 1 to 8, in the ranges surrounded by heavy lines, in the depths of the deep groove and the shallow groove corresponding to the ranges, the signal amount (absolute value) of the CTS signal is equal to or more than 14%, and thereby, stable tracking servo can be performed.

The following table 9 is a table in which the groove depths in areas where the above described signal amounts (absolute value) of the CTS signals surrounded by heavy lines are equal to or more than 14% are put together with respect to the deep groove and the shallow groove.

TABLE 9

| Phase depth X (deep groove) | Phase depth Y (shallow groove top) | Phase depth Y (shallow groove bottom) |
|---|---|---|
| 0.3521 | 0.2667 | 0.2667 |
| 0.3704 | 0.3571 | 0.2000 |
| 0.4000 | 0.4000 | 0.1493 |
| 0.4348 | 0.4348 | 0.1176 |
| 0.4762 | 0.4762 | 0.1042 |
| 0.5263 | 0.5263 | 0.1149 |
| 0.5882 | 0.4878 | 0.1613 |
| 0.6667 | 0.3175 | 0.3175 |

Figure 7:
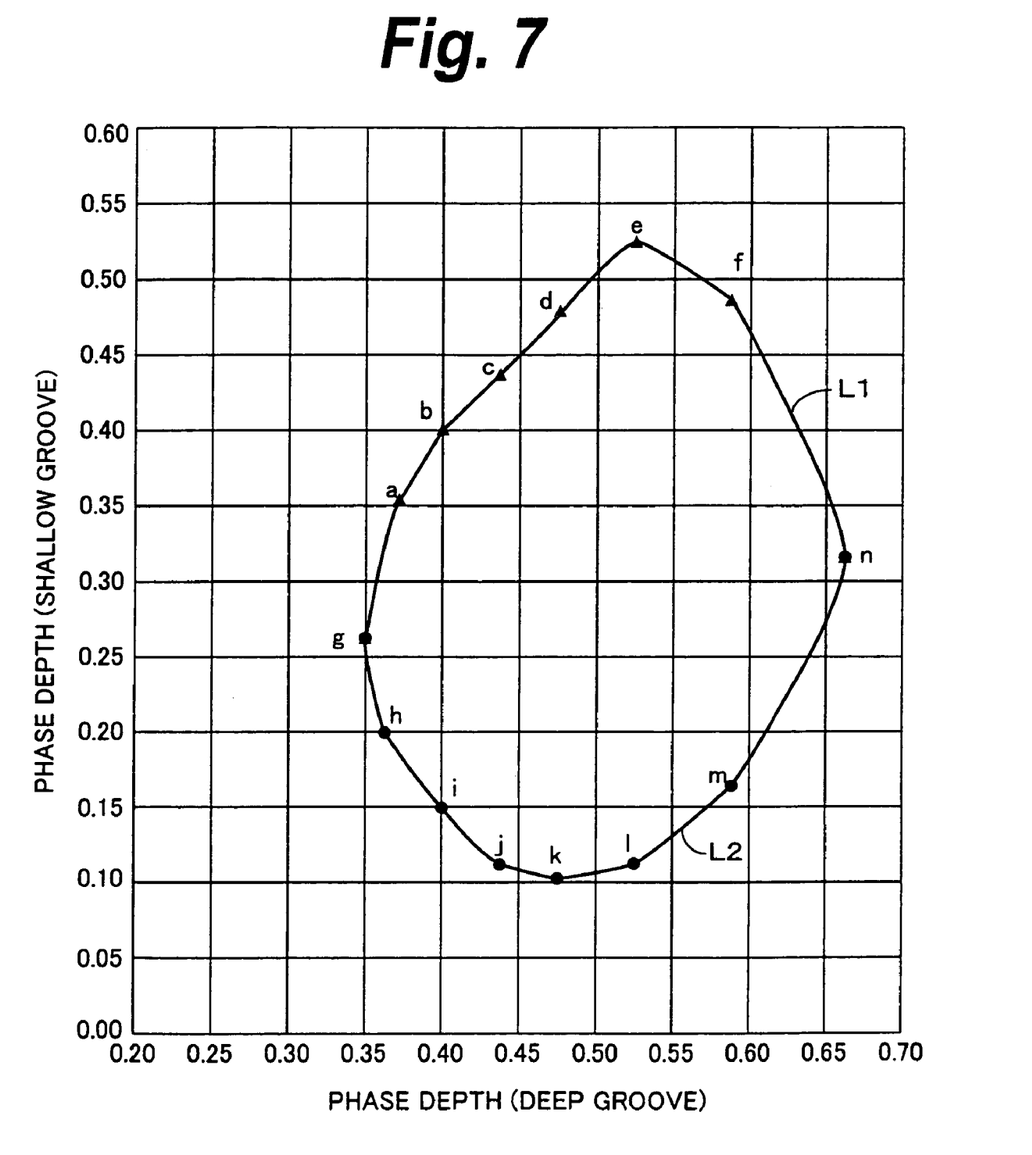
FIG. 7 is a diagram showing the relationship between a depth of a deep groove and a depth of a shallow groove in a condition in which a CTS signal amount is equal to or more than 14%.

Further, FIG. 7 shows a phase depth relationship between the shallow groove and the deep groove in a condition in which the signal amount of the CTS signal is equal to or more than 14% (in the range of the heavy line). The longitudinal axis in FIG. 7 represents the phase depth Y of the shallow groove, and the lateral axis represents the phase depth X of the deep groove. For example, Xa in coordinates (Xa, Ya) of a point a is obtained as 0.3703 . . . by an inverse number of the coefficient x of the deep groove shown in Table 1, i.e., by "½.7", and Ya is obtained as 0.3571 . . . by an inverse number of the coefficient x of the shallow groove (upper limit value) shown in Table 1, i.e., by "½.8". Further, for example, Xh in coordinates (Xh, Yh) of a point h is obtained as 0.3703 . . . by an inverse number of the coefficient x of the deep groove shown in Table 1, i.e., by "½.7", and Yh is obtained as 0.2 by an inverse number of the coefficient x of the shallow groove (lower limit value) shown in Table 1, i.e., by "⅕".

Therefore, the points a to f in FIG. 7 are upper limit values of the groove depth providing the CTS signal amount equal to or more than 14%, and the points h to m are lower limit values of the groove depth providing the push-pull signal amount equal to or more than 14%. That is, it is known that, within the range surrounded by the points a to n, the signal amount of the CTS signal is equal to or more than 14% and stable tracking servo can be performed.

Here, an approximated curve L1 connecting the point g-point e-point n is expressed by the following expression (17), an approximated curve L2 connecting the point g-point k-point n is expressed by the following expression (18).

$$Y=16.126X^5-123.24X^4+371.85X^3-544.35X^2+409.06X-119.33 \quad (17)$$

$$Y=1.8941X^4-11.776X^3+27.83X^2-29.495X+11.887 \quad (18)$$

Therefore, the area surrounded by the points a to n can be expressed by approximation as an area that satisfies the following expression (19) and expression (20).

$$Y \leq 16.126X^5-123.24X^4+371.85X^3-544.35X^2+409.06X-119.33 \quad (19)$$

$$Y \geq 1.8941X^4-11.776X^3+27.83X^2-29.495X+11.887 \quad (20)$$

That is, by forming the phase depth of the shallow groove and the phase depth of the deep groove so as to satisfy the above expressions (19) and (20), the signal amount of the CTS signal becomes equal to or more than 14%, and thereby, stable tracking servo can be performed.

Further, in order to evaluate whether recording and reproduction characteristics are good, magneto-optical recording and reproduction are performed in all recording areas of the six recording tracks of the two deep grooves and the shallow groove having suitable depths that provide the signal amount of the CTS signal equal to or more than 14%, the first land Ld1, the second land Ld2, and the third land Ld3. The jitter value at that time is on the order of 11%, and it is found that good recording and reproduction characteristics can be obtained.

In addition, since the wavelength λ of the laser beam is 650 nm and the numerical aperture NA is 0.52, the cutoff frequency 2NA/λ of the optical pickup is 1600 (number/mm). On the other hand, the evaluation optical disk has spatial frequency about 1613 (number/mm) when considered in half of the track period, i.e., 620 nm. Therefore, it is understood that, in an optical disk in which half of the track period of each of the six recording tracks is equal to or more than the cutoff frequency of the reproduction optical system, the push-pull signal and the CTS signal at sufficient levels can be obtained, and stable tracking servo and seeking can be performed.

Figure 8:
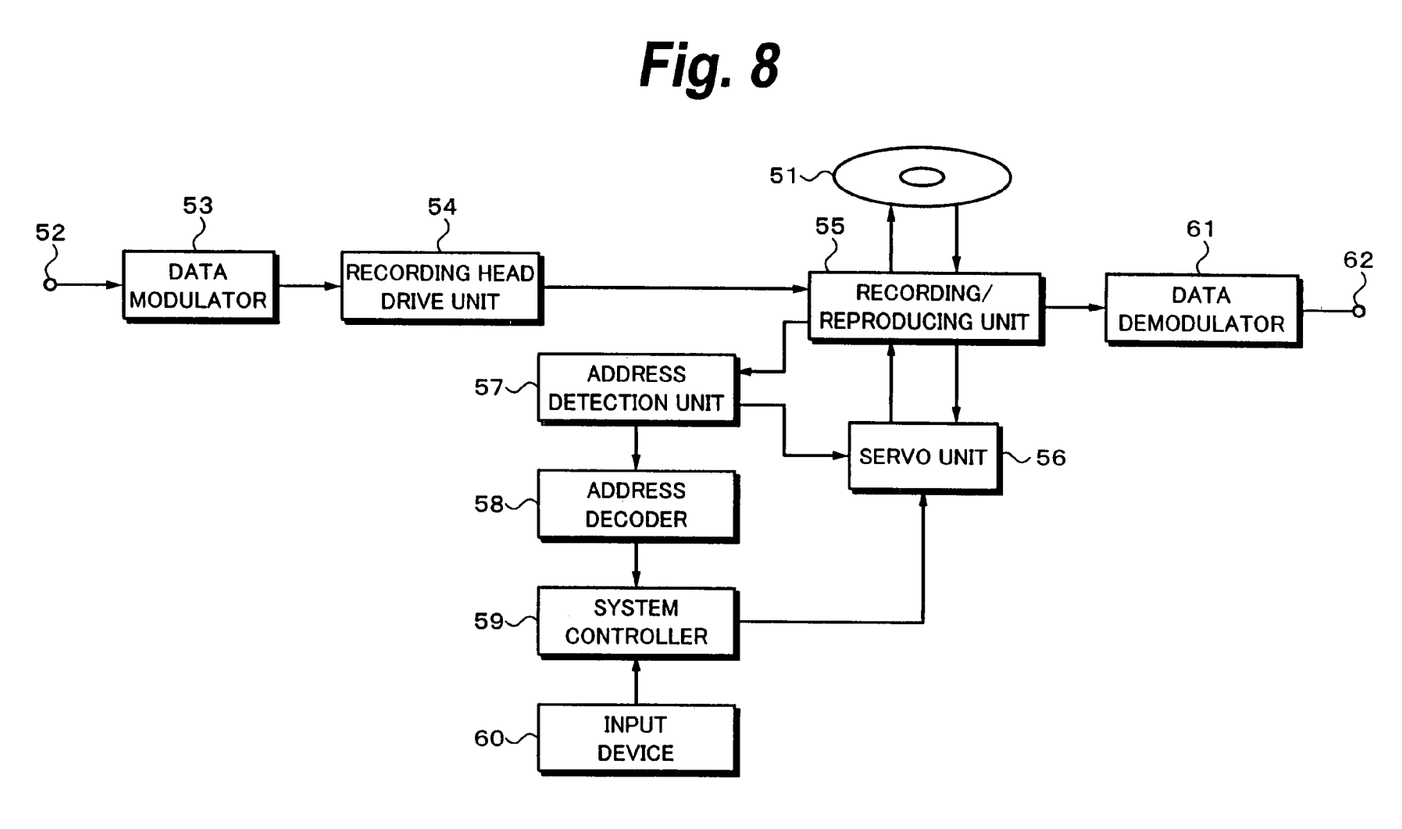
FIG. 8 is a block diagram of an example of a recording and reproducing apparatus for performing recording and reproduction on the magneto-optical disk to which the invention is applied.

FIG. 8 shows a constitution example of a recording and reproducing apparatus using the above described magneto-optical disk. In FIG. 8, the reference sign 51 denotes the magneto-optical disk in which two deep grooves and one shallow groove are alternately formed as described above. To an input terminal 52, data to be recorded is supplied. A data modulator 53 performs digital modulation on the input data. For example, the input data is modulated by RLL(1,7). In RLL(1,7), the shortest mark length is 2T and the longest mark length is 8T.

The output data of the data modulator 53 is supplied to a recording head drive unit 54. The recording head drive unit 54 supplies the modulated data to a recording head included in an recording/reproducing unit 55. The recording/reproducing unit 55 includes an optical pickup. At the time of recording, the optical pickup applies a laser beam for recording to the magneto-optical disk 51 to record the data.

Further, the optical pickup generates a tracking error signal, a focus error signal, and address information from reflected light by the magneto-optical disk 51. The tracking error signal is formed from the push-pull signal or the CTS signal. The tracking error signal and the focus error signal from the recording/reproducing unit 55 are output to a servo unit 56. The servo unit 56 generates a control signal for controlling the tracking and focusing of the optical pickup within the recording/reproducing unit 55, a control signal for controlling the rotation of the magneto-optical disk 51, and a control signal for controlling the movement of the optical pickup in the disk radial direction.

The address signal is output to an address detection unit 57. The address detection unit 57 demodulates the address information from the address signal and outputs the address information to an address decoder 58.

The address decoder 58 calculates an address from an address information signal supplied from the address detection unit 57, and outputs the address to a system controller 59. The system controller 59 is arranged so as to output a predetermined control signal to the servo unit 56 according to the address information supplied from the address decoder 58, and, when a signal corresponding to a predetermined operation is supplied from an input device 60, output a control signal corresponding to the operation to the servo unit 56 to control the recording/reproducing unit 55.

The reproduction data that has been read out by the optical pickup of the magneto-optical disk 51 and obtained by the processing in the recording/reproducing unit 55 is supplied to a data demodulator 61. In the data demodulator 61, demodulation processing of the digital modulation performed at the time of recording, for example, RLL(1,7) is performed. The reproduction data is taken out from an output terminal 62 of the data demodulator 61.

In the magneto-optical disk 1 according to the above described one embodiment, track density can be made as six times higher than the conventional one, stable tracking servo and seeking can be performed, and recording and reproduction characteristics of the total six recording tracks of two deep grooves, a shallow groove, and three lands are good. Further, the laser cutting device 10 can be used for forming the above described magneto-optical disk 1, and, in the recording and reproducing apparatus described by referring to FIG. 8, recording or reproduction of the above described magneto-optical disk 1 can be performed.

This invention is not limited to the above described one embodiment of the invention, but various modification and application can be made within the scope not departing from the content of the invention. The invention can be widely applied to an optical recording medium having grooves formed along recording tracks and a master for optical recording medium manufacture used for its manufacture, and the optical recording medium as a target of the invention may be, for example, any one of an optical recording medium exclusive to reproduction, an optical recording medium capable of repeated rewriting of data, or an optical recording medium capable of data adding, but incapable of deletion.

In addition, the data recording method is not specifically limited, and the optical recording medium as a target of the invention may be, for example, any one of an optical recording medium exclusive to reproduction in which data has been written in advance, a magneto-optical disk for performing recording and reproduction of data utilizing the magneto-optical effect or a phase change optical recording medium for performing recording and reproduction of data utilizing phase change of the recording layer.

Further, the invention can widely be applied to an optical recording medium having grooves formed in at least a part of a recording area thereof and a master for optical recording medium manufacture used for its manufacture. That is, for example, grooves may be formed on the entire recording area, or an area in which grooves are not formed and data is recorded by emboss pits may exist within the recording area.

As described above in detail, according to the invention, since the recording area is formed as total six tracks of the first to third grooves and the first to third lands, higher track density can be realized. Further, since the first and second grooves are formed as deep grooves and the third groove is formed as a shallow groove, by suitably setting the depths of these grooves, an optical recording medium having good recording and reproduction characteristics in which a signal amount of a CTS signal can be obtained sufficiently, and stable tracking servo can be performed, a master for optical recording medium manufacture by which such optical recording medium can be manufactured, and a recording and reproducing apparatus for performing recording and reproduction on such optical recording medium can be provided.

What is claimed is:

1. An optical recording medium having grooves formed along recording tracks and being applied with light having a predetermined wavelength λ for performing recording and/or reproduction, as the grooves, a first groove, a second groove, and a third groove shallower than the first groove and the second groove formed so as to be arranged adjacently, the medium having six recording tracks of the first to third grooves and three lands between the respective first to third grooves, wherein, assuming that a refractive index of a medium from a light entrance surface to the grooves is n, a depth coefficient of the first and second grooves is x, x×n/λ is a phase depth X of the first and second grooves, a depth coefficient of the third groove is y, and y×n/λ is a phase depth Y of the third groove, the depth coefficient x of the first and second grooves and the depth coefficient y of the third groove satisfy the following expressions (1) and (2), $$Y \leq 16.126X^5 - 123.24X^4 + 371.85X^3 - 544.35X^2 + 409.06X - 119.33 \quad (1)$$

$$Y \geq 1.8941X^4 - 11.776X^3 + 27.83X^2 - 29.495X + 11.887 \quad (2).$$

2. An optical recording medium according to claim 1, wherein half of a track period of each of the six recording tracks is equal to or more than a cutoff frequency of a reproduction optical system.

3. An optical recording medium according to claim 1, wherein a width of each of the three lands and a top width of the first to third grooves are substantially the same, and depths of the first and second grooves are substantially the same.

4. A master for optical recording medium manufacture used when manufacturing an optical recording medium having grooves formed along recording tracks and being applied with light having a predetermined wavelength λ for performing recording and/or reproduction,
 as the grooves, a first groove, a second groove, and a third groove shallower than the first groove and the second groove formed so as to be arranged adjacently,
 the medium having six recording tracks of the first to third grooves and three lands between the respective first to third grooves,
 wherein, assuming that a refractive index of a medium from a light entrance surface to the grooves is n, a depth coefficient of the first and second grooves is x, x×n/λ is a phase depth X of the first and second grooves, a depth coefficient of the third groove is y, and y×n/λ is a phase depth Y of the third groove, the depth coefficient x of the first and second grooves and the depth coefficient y of the third groove satisfy the following expressions (3) and (4), $$Y \leq 16.126X^5 - 123.24X^4 + 371.85X^3 - 544.35X^2 + 409.06X - 119.33 \quad (3)$$

$$Y \geq 1.8941X^4 - 11.776X^3 + 27.83X^2 - 29.495X + 11.887 \quad (4).$$

5. A recording and reproducing apparatus for an optical recording medium having grooves formed along recording tracks and being applied with light having a predetermined wavelength λ for performing recording and/or reproduction,
 as the grooves, a first groove, a second groove, and a third groove shallower than the first groove and the second groove formed so as to be arranged adjacently,
 the medium having six recording tracks of the first to third grooves and three lands between the respective first to third grooves,
 the apparatus performing recording and/or reproduction on the six recording tracks of the optical recording medium in which, assuming that a refractive index of a medium from a light entrance surface to the grooves is n, a depth coefficient of the first and second grooves is x, x×n/λ is a phase depth X of the first and second grooves, a depth coefficient of the third groove is y, and y×n/λ is a phase depth Y of the third groove, the depth coefficient x of the first and second grooves and the depth coefficient y of the third groove satisfy the following expressions (5) and (6), $$Y \leq 16.126X^5 - 123.24X^4 + 371.85X^3 - 544.35X^2 + 409.06X - 119.33 \quad (5)$$

$$Y \geq 1.8941X^4 - 11.776X^3 + 27.83X^2 - 29.495X + 11.887 \quad (6).$$

6. A recording and reproducing apparatus according to claim 5, wherein tracking servo is performed with a cross track signal.

7. A recording and reproducing method for an optical recording medium having grooves formed along recording tracks and being applied with light having a predetermined wavelength λ for performing recording and/or reproduction,
 as the grooves, a first groove, a second groove, and a third groove shallower than the first groove and the second groove formed so as to be arranged adjacently,
 the medium having six recording tracks of the first to third grooves and three lands between the respective first to third grooves,
 the method performing recording and/or reproduction on the six recording tracks of the optical recording medium in which, assuming that a refractive index of a medium from a light entrance surface to the grooves is n, a depth coefficient of the first and second grooves is x, x×n/λ is a phase depth X of the first and second grooves, a depth coefficient of the third groove is y, and y×n/X is a phase depth Y of the third groove, the depth coefficient x of the first and second grooves and the depth coefficient y of the third groove satisfy the following expressions (7) and (8), $$Y \leq 16.126X^5 - 123.24X^4 + 371.85X^3 - 544.35X^2 + 409.06X119.33 \quad (7)$$

$$Y \geq 1.8941X^4 - 11.776X^3 + 27.83X^2 - 29.495X + 11.887 \quad (8).$$

8. A recording and reproducing method according to claim 7, wherein tracking servo is performed with a cross track signal.

* * * * *